(12) United States Patent
Ko et al.

(10) Patent No.: US 11,691,291 B2
(45) Date of Patent: Jul. 4, 2023

(54) APPARATUS AND METHOD FOR GENERATING ROBOT INTERACTION BEHAVIOR

(71) Applicant: Electronics and Telecommunications Research Institute, Daejeon (KR)

(72) Inventors: Woo-Ri Ko, Daejeon (KR); Do-Hyung Kim, Daejeon (KR); Jae-Hong Kim, Daejeon (KR); Young-Woo Yoon, Daejeon (KR); Jae-Yeon Lee, Daejeon (KR); Min-Su Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 210 days.

(21) Appl. No.: 17/105,924

(22) Filed: Nov. 27, 2020

(65) Prior Publication Data

US 2022/0055221 A1 Feb. 24, 2022

(30) Foreign Application Priority Data

Aug. 21, 2020 (KR) .......................... 10-2020-0105409

(51) Int. Cl.
  *G06F 19/00* (2018.01)
  *B25J 11/00* (2006.01)
  (Continued)

(52) U.S. Cl.
  CPC .............. *B25J 11/001* (2013.01); *B25J 9/161* (2013.01); *B25J 9/163* (2013.01); *B25J 9/1664* (2013.01);
  (Continued)

(58) Field of Classification Search
  CPC . B25J 11/001; B25J 9/161; B25J 9/163; B25J 9/1664; B25J 9/1669; B25J 9/1692;
  (Continued)

(56) References Cited

U.S. PATENT DOCUMENTS 10,786,895 B2  9/2020  Lee et al.
10,800,043 B2  10/2020  Park et al.
(Continued)

FOREIGN PATENT DOCUMENTS

JP    2019030949 A    2/2019
KR    100639068 B1    10/2006
(Continued)

OTHER PUBLICATIONS

Ahmed Hussain Qureshi et al., "Robot gains Social Intelligence through Multimodal Deep Reinforcement Learning," 2016 IEEE-RAS 16th International Conference on Humanoid Robots (Humanoids), 2016, pp. 745-751.

(Continued)

*Primary Examiner* — Abby Y Lin
*Assistant Examiner* — Sohana Tanju Khayer
(74) *Attorney, Agent, or Firm* — William Park & Associates Ltd.

(57) ABSTRACT

Disclosed herein are an apparatus and method for generating robot interaction behavior. The method for generating robot interaction behavior includes generating co-speech gesture of a robot corresponding to utterance input of a user, generating a nonverbal behavior of the robot, that is a sequence of next joint positions of the robot, which are estimated from joint positions of the user and current joint positions of the robot based on a pre-trained neural network model for robot pose estimation, and generating a final behavior using at least one of the co-speech gesture and the nonverbal behavior.

20 Claims, 13 Drawing Sheets

(51) Int. Cl.
*B25J 9/16* (2006.01)
*B25J 13/00* (2006.01)

(52) U.S. Cl.
CPC .......... *B25J 9/1669* (2013.01); *B25J 9/1692* (2013.01); *B25J 11/0005* (2013.01); *B25J 13/003* (2013.01); *B25J 9/1661* (2013.01); *G05B 2219/40411* (2013.01)

(58) Field of Classification Search
CPC .... B25J 11/0005; B25J 13/003; B25J 9/1661; G05B 2219/40411
See application file for complete search history.

(56) References Cited

U.S. PATENT DOCUMENTS

| | | | |
|---|---|---|---|
| 2012/0191460 A1 | 7/2012 | Ng-Thow-Hing et al. | |
| 2017/0365277 A1* | 12/2017 | Park | G10L 15/063 |
| 2018/0133900 A1* | 5/2018 | Breazeal | B25J 19/026 |
| 2018/0229372 A1* | 8/2018 | Breazeal | B25J 11/0015 |
| 2018/0333862 A1* | 11/2018 | Hayashi | A63H 13/005 |
| 2021/0170585 A1* | 6/2021 | Kim | G06N 20/00 |
| 2021/0201661 A1* | 7/2021 | Al Jazaery | G05B 13/027 |
| 2022/0028406 A1* | 1/2022 | Burmistrov | G10L 21/0272 |

FOREIGN PATENT DOCUMENTS

| | | |
|---|---|---|
| KR | 1020180072978 A | 7/2018 |
| KR | 1020190098781 A | 8/2019 |
| KR | 1020200036089 A | 4/2020 |

OTHER PUBLICATIONS

Yang Hyun Seung et al., Emotional Interface Technologies for Service Robot, The Journal of Korea Robotics Society, Sep. 2006 pp. 58-65.

* cited by examiner

APPARATUS AND METHOD FOR GENERATING ROBOT INTERACTION BEHAVIOR

CROSS REFERENCE TO RELATED APPLICATION

This application claims the benefit of Korean Patent Application No. 10-2020-0105409, filed Aug. 21, 2020, which is hereby incorporated by reference in its entirety into this application.

BACKGROUND OF THE INVENTION

1. Technical Field

Embodiments of the present disclosure relate generally to technology for allowing a robot to understand a user's utterance and nonverbal behavior and generate an interaction behavior corresponding thereto.

2. Description of the Related Art

With a rapid increase in the number of one-person households, especially senior citizens who live alone, interest in social robots that are capable of emotionally communicating with persons while living with the persons has increased. Recently, commercial robots, such as Aibo or Jibo, have appeared one after another. In order to allow these robots to emotionally communicate with a user, technology for understanding the user's utterance (speech) and behavior and generating an interaction behavior corresponding thereto is required. For example, the technology must enable not only conversation with the user, but also generation of required behavior such that, when the user delightedly raises one of his or her hands, the robot high-fives the user while putting its hand along with the user or such that, when the user cries while burying his or her face in his or her hands, the robot stretches out both its arms to embrace the user. Such technology may provide a new level of emotional support service through the understanding and sympathy of humans.

Nonverbal behaviors of existing robots are realized such that a person personally derives a nonverbal behavior pattern based on interpersonal-communication-related theory and experimental results in the fields of psychology or sociology and describes the nonverbal behavior pattern in the form of rules or a state transition model. Such a communication scheme defines all nonverbal behaviors in advance, selects one behavior matching the current situation based on the rules, and then induces the robot to move along a defined trajectory based on the behavior. Therefore, there frequently occurs the case where the generated nonverbal behavior is uniform and it is impossible to respond to a wide variety of situations.

Also, a social robot communicates with a human through utterance (speech). There may occur the case where, when utterance and nonverbal communication are simultaneously performed, one of a co-speech gesture and a nonverbal behavior must be selected. For example, when the user holds out his or her hand for a handshake while saying "It is a fine day", the robot may answer with "Yes, it is a sunny day" while generating a behavior matching the utterance, or may perform a handshake as requested by the user. However, the conventional technologies take into consideration single-factor communicative situations (contexts) in which only a nonverbal interaction is taken or in which only communication based on utterance is performed, thus making it impossible to respond to complex communicative situations.

PRIOR ART DOCUMENTS

Patent Documents (Patent Document 1) Korean Patent Application Publication No. 10-2004-0070673

SUMMARY OF THE INVENTION

An embodiment is intended to generate natural interaction behavior of a robot in a complex communicative context in which utterance and nonverbal communication are simultaneously performed.

In accordance with an aspect, there is provided a method for generating robot interaction behavior, including generating co-speech gesture of a robot corresponding to utterance input of a user, generating a nonverbal behavior of the robot, that is a sequence of next joint positions of the robot, which are estimated from joint positions of the user and current joint positions of the robot based on a pre-trained neural network model for robot pose estimation, and generating a final behavior using at least one of the co-speech gesture and the nonverbal behavior.

Generating the nonverbal behavior of the robot may include modifying the nonverbal behavior, generated based on the neural network model for robot pose estimation, depending on an emotional state of the robot.

Modifying the nonverbal behavior may be configured to change a volume of the nonverbal behavior, calculated depending on an emotional state value indicating a degree of pleasantness or unpleasantness, and a speed of the nonverbal behavior, calculated depending on an emotional state value indicating a degree of intensity or mildness.

Generating the final behavior may be configured to, when the robot is in a waiting state, output only the co-speech gesture of the robot depending on the utterance input of the user, output only the nonverbal behavior of the robot depending on behavior input of the user, and simultaneously output the co-speech gesture and the nonverbal behavior of the robot depending on the utterance input of the user and the behavior input of the user.

Generating the final behavior may be configured to, when the robot is in a co-speech gesture state, output a new co-speech gesture of the robot depending on the utterance input of the user, simultaneously output a previous co-speech gesture and a new nonverbal behavior of the robot depending on behavior input of the user, and simultaneously output a new co-speech gesture and a new nonverbal behavior of the robot depending on the utterance input of the user and the behavior input of the user.

Generating the final behavior may be configured to, when the robot is in a nonverbal behavior state, simultaneously output a new co-speech gesture and a previous nonverbal behavior of the robot depending on the utterance input of the user, output a new nonverbal behavior of the robot depending on behavior input of the user, and simultaneously output a new co-speech gesture and a new nonverbal behavior of the robot depending on the utterance input of the user and the behavior input of the user.

Generating the final behavior may include, when the robot simultaneously outputs a co-speech gesture and a nonverbal behavior, determining priorities of the two behaviors, calculating a motional variation of a behavior having a higher priority, and outputting a new behavior based on the motional variation, wherein the new behavior is any one of the two behaviors or the two behaviors so as to overlap each other.

Determining the priorities may be configured to determine the nonverbal behavior to have a priority higher than that of the co-speech gesture, or to determine the previous nonverbal behavior to have a priority higher than that of the new nonverbal behavior.

Calculating the motional variation may be configured to calculate the motional variation as a sum of positional variations of all joints depending on each behavior.

Outputting the new behavior may be configured to, when the motional variation is greater than an upper threshold value, output a behavior having a higher priority, when the motional variation is less than a lower threshold value, output a behavior having a lower priority, and when the motional variation is present between the upper threshold value and the lower threshold value, overlap the two behaviors with each other.

Outputting a new behavior may be configured to upon overlapping the two behaviors, detect body categories respectively corresponding to the two behaviors and output motions by the detected body categories used to express the two behaviors, when at least one of the detected body categories corresponds to both of the two behaviors, at least one motion by the at least one of the detected body categories corresponds to only a behavior having a higher priority.

The body categories may include a head, a torso, a right arm, a left arm, and a lower half of a body.

Outputting a new behavior may be configured to, upon detecting body categories depending on behaviors, detect the body categories based on positional variations of joints for respective body categories corresponding to each behavior.

In accordance with another aspect, there is provided an apparatus for generating robot interaction behavior, including a memory for storing at least one program, and a processor for executing the program, wherein the program performs generating co-speech gesture of a robot corresponding to utterance input of a user, generating a nonverbal behavior of the robot, that is a sequence of next joint positions of the robot, which are estimated from joint positions of the user and current joint positions of the robot based on a pre-trained neural network model for robot pose estimation, and generating a final behavior using at least one of the co-speech gesture and the nonverbal behavior.

Generating the nonverbal behavior of the robot may include modifying the nonverbal behavior, generated based on the neural network model for robot pose estimation, depending on an emotional state of the robot, and modifying the nonverbal behavior may be configured to change the nonverbal behavior based on a volume of the nonverbal behavior, calculated depending on an emotional state value indicating a degree of pleasantness or unpleasantness, and a speed of the nonverbal behavior, calculated depending on an emotional state value indicating a degree of intensity or mildness.

Generating the final behavior may include, when the robot simultaneously outputs a co-speech gesture and a nonverbal behavior, determining priorities of the two behaviors, calculating a motional variation of a behavior having a higher priority, and outputting a new behavior based on the motional variation, wherein the new behavior is any one of the two behaviors or the two behaviors so as to overlap each other.

Outputting the new behaviors may be configured to, when the motional variation is greater than an upper threshold value, output a behavior having a higher priority, when the motional variation is less than a lower threshold value, output a behavior having a lower priority, and when the motional variation is present between the upper threshold value and the lower threshold value, overlap the two behaviors with each other.

Outputting the two behaviors may be configured to, upon outputting the two behaviors so as to overlap each other, detect body categories respectively corresponding to the two behaviors based on positional variations of joints for respective body categories corresponding to each behavior, and output motions by the detected body categories used to express the two behaviors, when at least one of the detected body categories corresponds to both of the two behaviors, at least one motion by the at least one of the detected body categories corresponds to only a behavior having a higher priority.

In accordance with a further aspect, there is provided a method for generating robot interaction behavior, including generating a co-speech gesture of a robot corresponding to an utterance input of a user, generating a nonverbal behavior of the robot corresponding to a behavior input of the user, and generating a final behavior using at least one of the co-speech gesture and the nonverbal behavior, wherein generating the final behavior includes, when the robot outputs a co-speech gesture and a nonverbal behavior, determining priorities of the two behaviors, calculating a motional variation of a behavior having a higher priority, and outputting a new behavior based on the motional variation, wherein the new behavior is any one of the two behaviors or the two behaviors so as to overlap each other.

Outputting the new behavior may be configured to, upon outputting the two behaviors so as to overlap each other, detect body categories respectively corresponding to the two behaviors based on positional variations of joints for respective body categories corresponding to each behavior, and output motions by the detected body categories used to express the two behaviors, when at least one of the detected body categories corresponds to both of the two behaviors, at least one motion by the at least one of the detected body categories corresponds to only a behavior having a higher priority.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
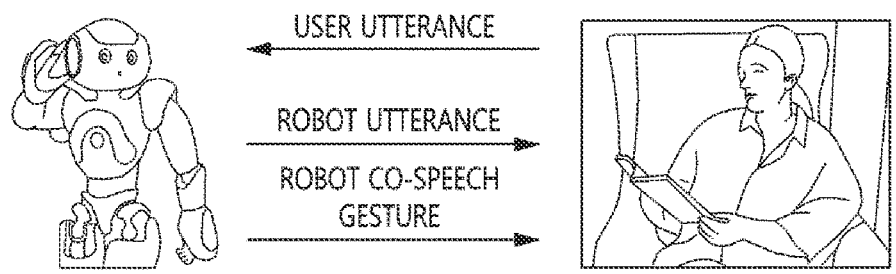
FIG. 1 is an exemplary diagram illustrating an utterance communicative context between a robot and a human.

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a "first" component, which will be described below, may alternatively be a "second" component without departing from the technical spirit of the present invention.

The terms used in the present specification are merely used to describe specific embodiments and are not intended to limit the present invention. A singular expression includes the plural sense unless a description to the contrary is specifically made in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitely defined in the present specification.

Hereinafter, an apparatus and method for generating robot interaction behavior will be described in detail with reference to FIGS. 1 to 16.

Figure 2:
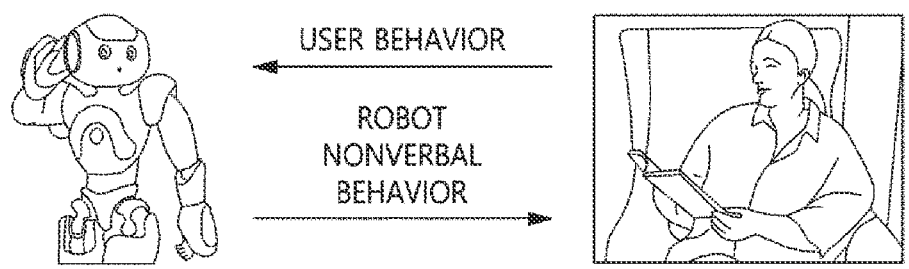
FIG. 2 is an exemplary diagram illustrating a nonverbal communicative context between a robot and a human.
Figure 3:
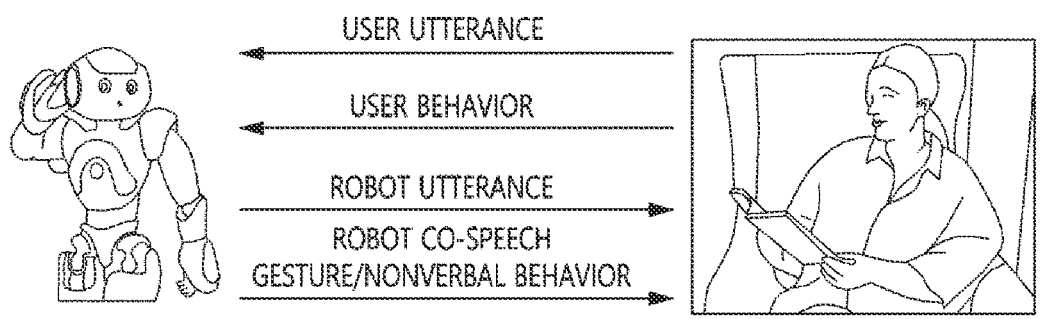
FIG. 3 is an exemplary diagram illustrating a complex communicative context between a robot and a human.

FIG. 1 is an exemplary diagram illustrating an utterance communicative context between a robot and a human. FIG. 2 is an exemplary diagram illustrating a nonverbal communicative context between a robot and a human, and FIG. 3 is an exemplary diagram illustrating a complex communicative context between a robot and a human.

Communicative contexts (situations) between a robot and a human may be chiefly divided into an utterance (speech) communicative context and a nonverbal communicative context.

Here, the utterance communicative context may be a situation in which the robot recognizes a user's speech, selects speech corresponding to the user's speech, and performs co-speech gesture corresponding to the robot's speech, as illustrated in FIG. 1. Here, the nonverbal communicative context may be a situation in which the robot recognizes a user's nonverbal behavior and performs nonverbal behavior corresponding to the user's nonverbal behavior, as illustrated in FIG. 2.

In the conventional technology, the utterance communicative context and the nonverbal communicative context were independently and individually executed. That is, to date, since single-factor communicative contexts that enable only nonverbal interaction or only utterance-based communication are taken into consideration, it has been difficult to respond to a complex communicative context.

An apparatus and method for generating robot interaction behavior according to an embodiment further considers a complex communicative context as well as the above-described utterance communicative context and nonverbal communicative context.

Here, the complex communicative context may be a situation in which, with the recognition of user utterance and user behavior, utterance and interaction behavior of the robot corresponding thereto are simultaneously performed, as illustrated in FIG. 3.

Figure 4:
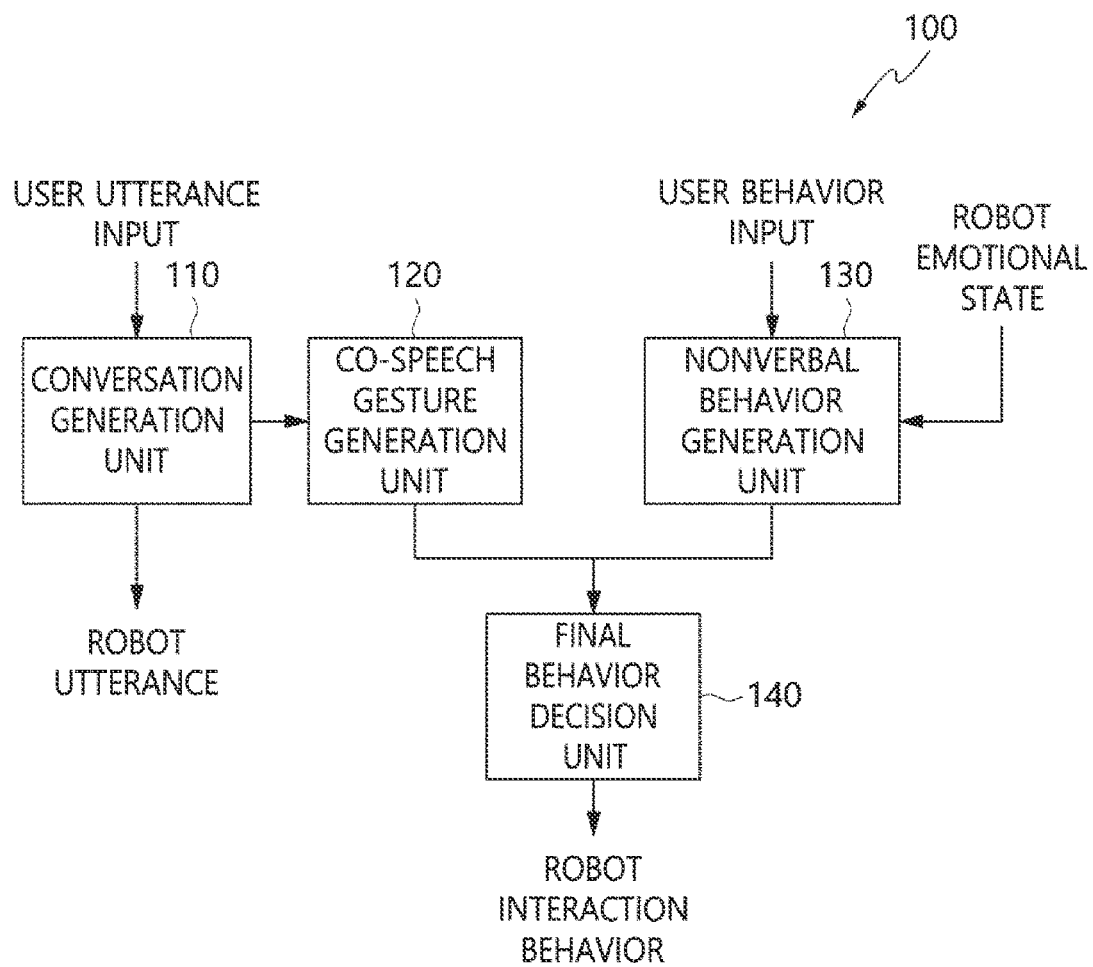
FIG. 4 is a schematic block diagram illustrating an apparatus for generating robot interaction behavior according to an embodiment.

FIG. 4 is a schematic block diagram illustrating the configuration of an apparatus for generating robot interaction behavior according to an embodiment.

Referring to FIG. 4, an apparatus 100 for generating robot interaction behavior (hereinafter also referred to as a 'robot interaction behavior generation apparatus 100') may include a conversation generation unit 110, a co-speech gesture generation unit 120, a nonverbal behavior generation unit 130, and a final behavior decision unit 140.

The conversation generation unit 110 recognizes a spoken (uttered) sentence corresponding to the utterance (speech) input of a user and generates a sentence to be uttered by the robot corresponding to the recognized uttered sentence.

Here, the conversation generation unit 110 may generate the sentence to be uttered by the robot corresponding to the user's uttered sentence based on a pre-trained conversation model based on conversation examples.

At this time, the example-based conversation model searches various conversation examples between persons for a conversation example most similar to the user's uttered sentence, and generates the sentence to be uttered by the robot based on the found conversation example.

Further, the conversation generation unit 110 may be operated based on a Partially Observable Markov Decision Process (POMDP)-based conversation model using reinforcement learning, such as Google's AlphaGo.

The conversation generation unit 110 may convert the generated sentence to be uttered into sound audible to humans, and may output the audible sound. In this case, the sentence to be uttered may be expressed in human speech through text-to-speech (TTS) technology. Here, the generated sentence to be uttered may vary depending on the conversation subject or context.

The co-speech gesture generation unit 120 generates the robot's behavior corresponding to the robot's sentence to be uttered, generated by the conversation generation unit 110, that is, the gesture of the body and arms of the robot. Such behavior of the robot corresponding to the sentence to be uttered is referred to as "co-speech gesture".

At this time, the attributes of co-speech gesture follows technology disclosed in U.S. patent application Ser. No. 16/102,398 entitled "Apparatus for Determining Speech Properties and Motion Properties of Interactive Robot and Method Thereof".

First, a conversation counterpart is analyzed using camera image information captured from the viewpoint of the robot, and the attribute of the gesture is determined. Here, as the gesture attribute, at least one of a volume, speed, and frequency may be extracted.

Here, "volume" is the size of space occupied by the user's gesture, and indicates how large a gesture is made. "Speed" indicates how fast the hand or body moves when making a gesture. "Frequency" denotes the frequency at which a gesture is made during conversation, and indicates how often the corresponding gesture is made. Such attribute parameters may be acquired using image-based user skeleton detection technology.

Next, the place (spatial) context in which the robot and the human (user) have a conversation with each other is recognized. For example, the conversation space may be recognized such that it is classified as a house, an office, a classroom, an outdoor area, or the like.

The co-speech gesture generation unit 120 may determine the gesture attribute of the robot by aggregating the above-described gesture attribute of the conversation counterpart and the spatial context information. Further, the gesture attribute of the robot may also be determined by styles predefined by a developer or the user.

The nonverbal behavior generation unit 130 generates the nonverbal behavior of the robot corresponding to the behavior input of the user. The behavior of the robot corresponding to the behavior input of the user is referred to as "nonverbal behavior". The detailed operation of the nonverbal behavior generation unit 130 will be described later with reference to FIGS. 5 to 10.

The final behavior decision unit 140 decides on at least one of co-speech gesture and nonverbal behavior as the final behavior based on the current behavior of the robot and the user input.

The final behavior decision unit 140 may decide on at least one of co-speech gesture and nonverbal behavior as the final behavior based on at least one of the utterance input and the behavior input of the user and the current behavior of the robot.

Here, the current behavior of the robot may include a waiting state, a co-speech gesture state, and a nonverbal behavior state. Here, the waiting state means the state in which the robot stands by without taking any action, the co-speech gesture state means the state in which the robot expresses co-speech gesture while uttering, and the nonverbal behavior state means the state in which the robot expresses nonverbal behavior corresponding to the user's behavior.

At this time, the user input may include the case where only user utterance (speech) is input, the case where only user behavior is input, and the case where user utterance and user behavior are simultaneously input. Accordingly, at least one of co-speech gesture and nonverbal behavior may be generated by at least one of the co-speech gesture generation unit 120 and the nonverbal behavior generation unit 130 illustrated in FIG. 4.

Then, the final behavior decision unit 140 decides on at least one of co-speech gesture and nonverbal behavior as the final behavior by at least one of the co-speech gesture generation unit 120 and the nonverbal behavior generation unit 130 depending on the current behavior of the robot, and then generates the final behavior.

Also, the selection of the final behavior of the robot by the final behavior decision unit 140 may be premised on the following assumption. Here, the assumption may include at least one of the assumption that the utterance input of the user is recognized at the time point at which the utterance is completely finished, the assumption that the utterance and the co-speech gesture of the robot simultaneously start and end, the assumption that the generation of utterance of the robot is performed independently of the expression of the robot's behavior, and the assumption that, when the behavior of the robot switches to another behavior, those behaviors can be naturally connected using existing technology (e.g., interpolation or the like).

The detailed operation of the final behavior decision unit 140 will be described later with reference to FIGS. 11 to 15.

Figure 5:
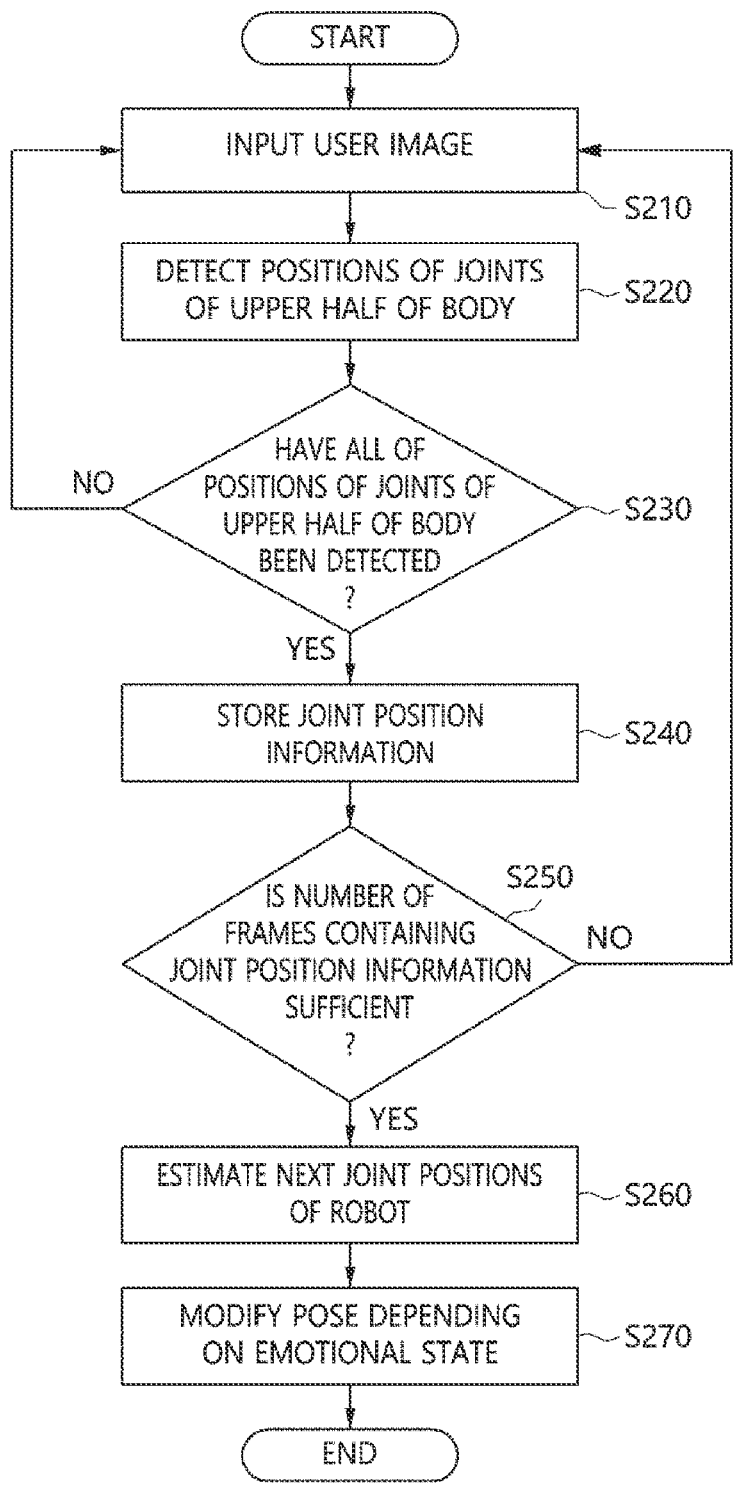
FIG. 5 is a flowchart illustrating the operation of a nonverbal behavior generation unit according to an embodiment.
Figure 6:
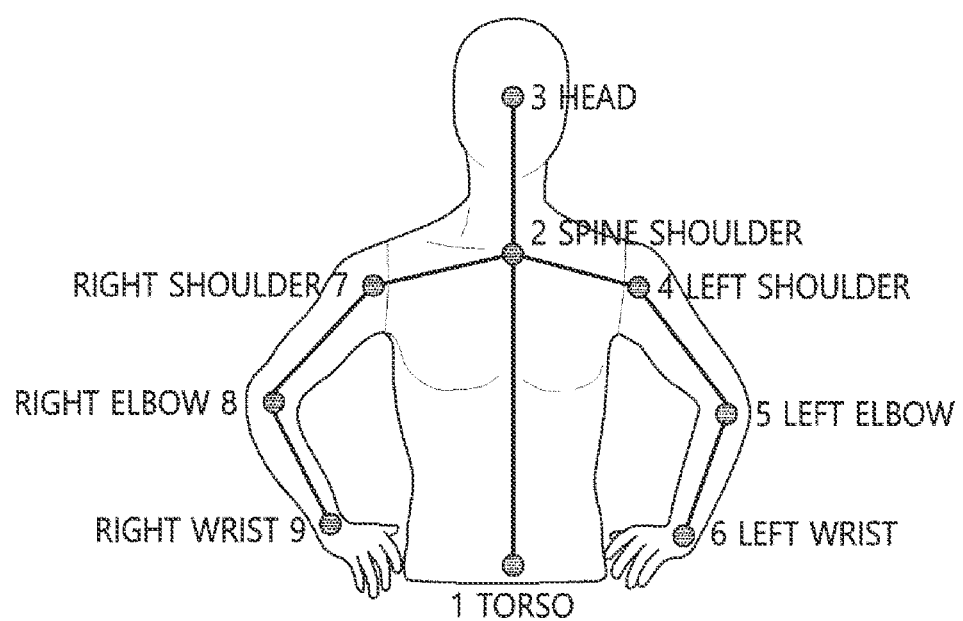
FIG. 6 is an exemplary diagram illustrating the joint positions of a user.

FIG. 5 is a flowchart for explaining the operation of the nonverbal behavior generation unit according to an embodiment, and FIG. 6 is an exemplary diagram illustrating the joint positions of the user.

Referring to FIG. 5, the nonverbal behavior generation unit 130 captures an image including the upper half of the user's body from the viewpoint of the robot at the point where a robot is currently located at step S210. That is, an image of the user may be captured through a camera installed at the position of the forehead or the eyes of the robot so that the image can be captured in the direction of the viewpoint at which the robot gazes.

Thereafter, the nonverbal behavior generation unit 130 detects the positions of the joints of the upper half of the user's body from the captured image at step S220.

In this case, the joints of the upper half of the body may include the torso, spine shoulder, head, left shoulder, left elbow, left wrist, right shoulder, right elbow, and right wrist, as illustrated in FIG. 6.

The nonverbal behavior generation unit 130 determines whether all of the positions of joints of the upper half of the user's body have been detected at step S230.

If it is determined at step S230 that not all of the positions of joints of the upper half of the user's body have yet been detected, the nonverbal behavior generation unit 130 repeatedly performs steps S210 to S230 until all of the positions of joints of the upper half of the user's body are detected.

In contrast, if it is determined at step S230 that all of the positions of joints of the upper half of the user's body have been detected, the nonverbal behavior generation unit 130 stores information about the current positions of the joints at step S240.

Thereafter, the nonverbal behavior generation unit 130 determines whbether the number of frames containing joint position information that are stored is sufficient at step S250. That is, whether the number of frames containing joint position information is equal to or greater than a predetermined number, for example, 20, is determined.

If it is determined at step S250 that the number of frames containing joint position information of the upper half of the user's body is not sufficient, the nonverbal behavior generation unit 130 repeatedly performs steps S210 to S250.

In contrast, if it is determined at step S250 that the number of frames containing joint position information that are stored is sufficient, the nonverbal behavior generation unit 130 estimates the next positions of the joints of the robot from the positions of joints of the upper half of the user's body and the current positions of the joints of the robot based on a pre-trained neural network model for robot pose estimation (see FIG. 7) at step S260. That is, the positions of the joints of the robot at the pose to be taken by the robot depending on the nonverbal behavior of the robot are estimated. A description of the neural network model for robot pose estimation will be made in detail later with reference to FIGS. 7 and 8.

In addition, the nonverbal behavior generation unit 130 modifies the nonverbal behavior of the robot based on the emotional state of the robot at step S270. Here, the emotional state of the robot may be digitized depending on the scheme proposed by Russell in 1978.

Further, the nonverbal behavior generation unit 130 may determine the attributes of the robot's nonverbal behavior based on the digitized emotional state of the robot. At this time, the attributes of the nonverbal behavior may include at least one of attributes including a volume and a speed.

That is, the nonverbal behavior generation unit 130 may modify the nonverbal behavior based on the volume of the nonverbal behavior, which is calculated depending on an emotional state value indicating the degree of pleasantness or unpleasantness, and the speed of nonverbal behavior, which is calculated depending on an emotional state value indicating the degree of intensity or mildness.

The determination of the attributes of the nonverbal behavior based on the emotional state of the robot digitized depending on the scheme proposed by Russell will be described in detail later with reference to FIGS. 9 and 10.

Figure 7:
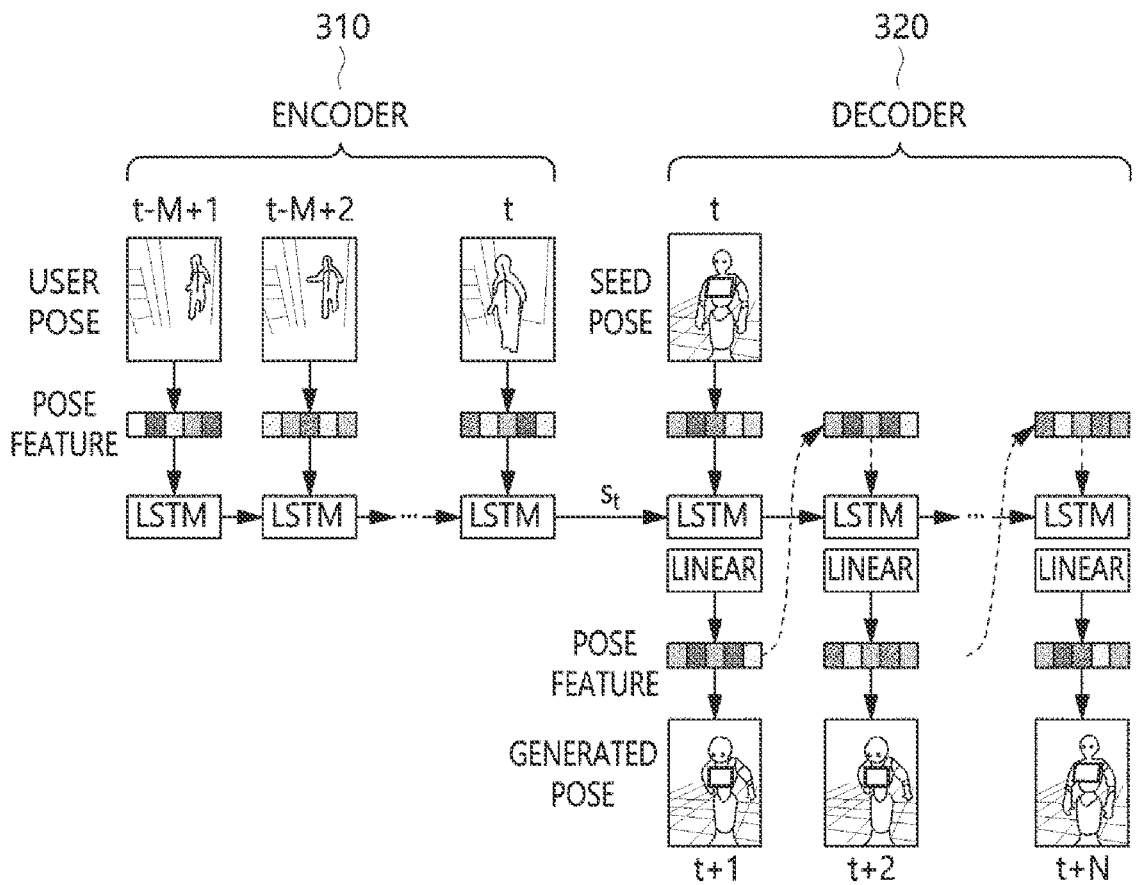
FIG. 7 is an exemplary diagram illustrating a neural network model for robot pose estimation according to an embodiment.

FIG. 7 is an exemplary diagram illustrating a neural network model for robot pose estimation according to an embodiment.

Referring to FIG. 7, a neural network model 300 for robot pose estimation (hereinafter also referred to as a "robot pose estimation neural network model 300") receives pieces of sequential data indicating the current positions and previous positions of joints of a user at each step (frame), and outputs the next position values of the joints of the robot. The output next position values of the joints of the robot may be transferred to the robot, and may then be used to generate a series of motions, that is, the pose of the robot.

The robot pose estimation neural network model 300 may chiefly include an encoder 310, which receives the position values of joints of the user for respective sequences, extracted from a first-person view image of the robot, and processes the position values of the joints, and a decoder 320, which receives the output values of the encoder 310 and the current pose of the robot and outputs the next positions of the joints of the robot.

Here, the robot pose estimation neural network model 300 may be implemented in the form of a learning model using the learning algorithm of a Recurrent Neural Network (RNN) or Long Short-Term Memory (LSTM).

The Recurrent Neural Network (RNN) or the Long Short-Term Memory (LSTM) learning algorithm is a learning algorithm which learns time-series data varying with time and predicts artificial intelligence. The RNN, which stacks pieces of data occurring every moment on an artificial neural network structure, has the deepest network structure, among deep-learning structures. As examples of the time-series data, data such as a stock price, human motion, weather, the number of Internet connections, and a keyword may be considered. The LSTM learning algorithm is an algorithm which allows gate units called long short-term memory to be arranged at respective nodes, thus solving a phenomenon (a vanishing gradient problem) by which an artificial neural network becomes excessively deep and then pieces of previously stored past data vanish.

At this time, both the encoder 310 and the decoder 320 may be implemented as the Recurrent Neural Network (RNN) or the Long Short-Term Memory (LSTM).

Here, the value output from the encoder 310 may be information containing the behavior information of the user.

Meanwhile, the robot pose estimation neural network model 300 may be learned in advance through a machine-learning method using nonverbal behavior learning data that is generated based on interaction data between persons by a neural-network-model learning apparatus (not illustrated) for robot pose estimation.

For sufficient learning, the nonverbal behavior learning data must be a large amount of data. In this case, the neural-network-model learning apparatus for robot pose estimation may generate such nonverbal behavior learning data by utilizing an open human-human interaction data set, such as K3HI, ShakeFive2, SBU Kinect Interaction, or NTU RGB+D.

Figure 8:
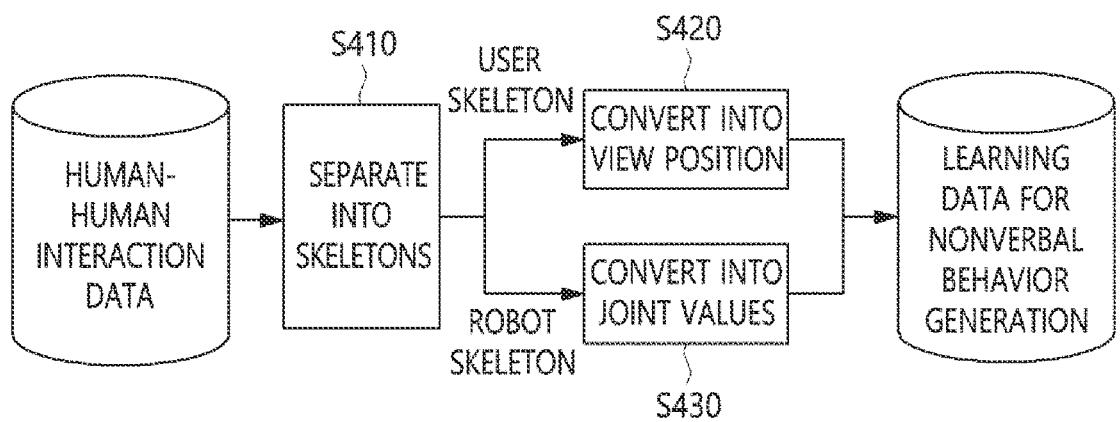
FIG. 8 is a diagram for explaining a process for converting human-human interaction data into nonverbal behavior learning data according to an embodiment.

FIG. 8 is a diagram for explaining a process for converting human-human interaction data into nonverbal behavior learning data according to an embodiment.

Referring to FIG. 8, the human-human interaction learning data may be obtained by capturing images of interaction between two humans using an RGB-D camera. That is, such data may be obtained by capturing images of a handshake or high-five scene or the like.

In this case, the human-human interaction learning data may be provided together with skeleton information. The following Table 1 shows an example of human-human interaction data.

TABLE 1

| Human 1 (user role) | Human 2 (robot role) |
| --- | --- |
| Opening door and entering | Taking a bow |
| Not taking a look from a distance | Looking |
| Making a gesture to come closer | Going closer |
| Taking a closer look | Touching hair |
| Holding out one hand forwards | Holding out two hands to shake hands |
| Covering face with hands | Holding out two hands to hug |
| High-fiving | High-fiving |
| Preparing hand to hit | Shrinking while blocking with hand |
| Wave hand to go away | Turning back |
| Turning around and walking out | Taking a bow |

Referring to FIG. 8, the human-human interaction data is separated into a user skeleton and a robot skeleton depending on the behavior (actions) to be learned at step S410.

Typically, since the behavior of the user is performed first, and the robot then responds to the user behavior, the skeleton of human 1 who first starts behavior may be separated as a user skeleton, and the skeleton of human 2 who subsequently takes behavior responding thereto may be separated as a robot skeleton, as in the case of Table 1.

Here, the user skeleton and the robot skeleton which are separated may be represented by reference coordinates of a full-view camera. Therefore, the user skeleton may be converted into a first-person view position of the robot at step S420. Further, the robot skeleton may be converted into the joint position values of the robot at step S430.

The user skeleton and the robot skeleton converted in this way are used as learning data for generating nonverbal behavior.

That is, the neural-network-model learning apparatus (not illustrated) for robot pose estimation may input the user skeleton of the nonverbal behavior learning data, generated as described above, to the robot pose estimation neural network model 300, compare the output of the robot pose estimation neural network model 300 with the joint position values of the robot skeleton labeled on the user skeleton, and update weights while back-propagating the robot pose estimation neural network model.

Figure 9:
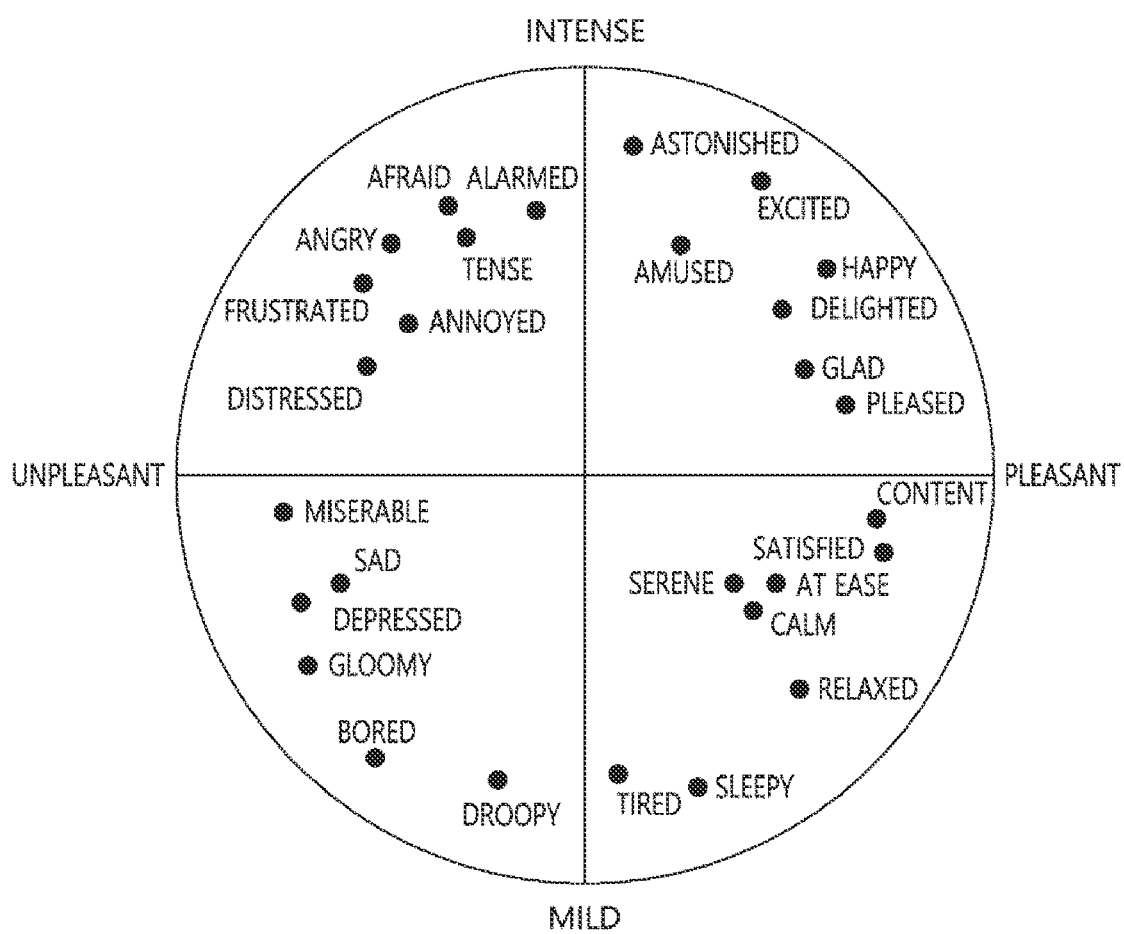
FIG. 9 is a diagram illustrating emotional state representation as proposed by Russell.
Figure 10:
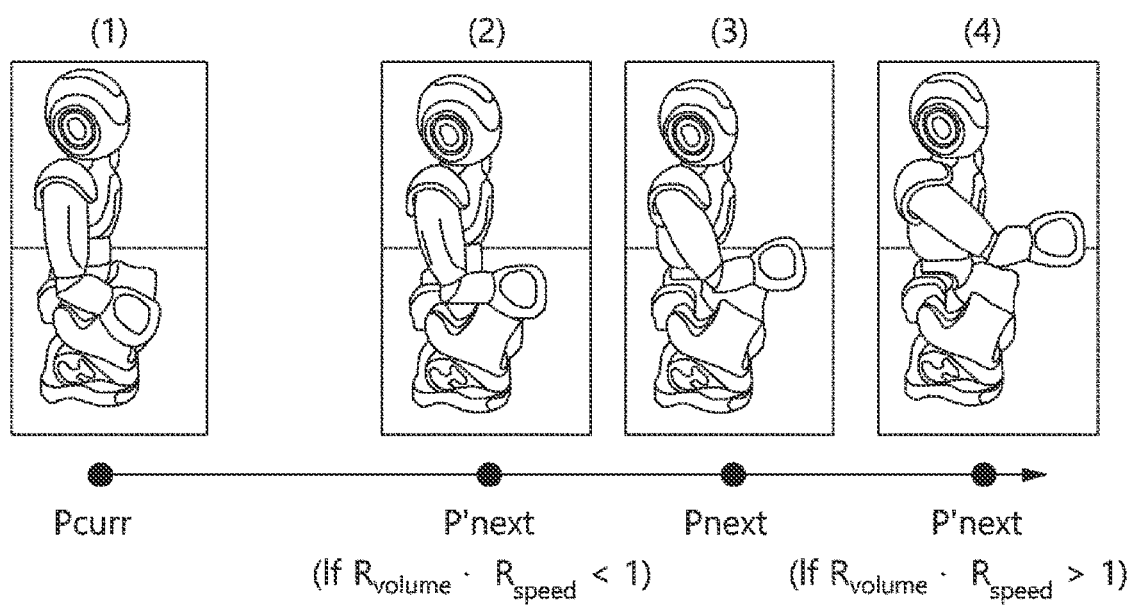
FIG. 10 is an exemplary diagram illustrating a robot's pose in which the emotional state of the robot is reflected.

FIG. 9 is a diagram illustrating emotional state representation as proposed by Russell. and FIG. 10 is an exemplary diagram illustrating a robot's pose in which the emotional state of the robot is reflected.

Referring to FIG. 9, the internal emotional state of the robot is represented by values on pleasant/unpleasant and intense/mild axes (i.e., pleasantness-arousal axes) according to the framework proposed by Russell in 1978.

The pleasant/unpleasant axis, which is the horizontal axis illustrated in FIG. 9, represents goodness-badness of emotion or the degree of favorability of an impression. An emotional state value $e_p$ on the pleasant/unpleasant axis has a range of [−1, 1]. That is, the case where the value of $e_p$ is 1 indicates a pleasant state, and the case where $e_p$ is −1 indicates an unpleasant state.

An intense/mild axis, which is the vertical axis illustrated in FIG. 9, represents the degree of arousal or excitement. An emotional state value $e_a$ on this intense/mild axis has a range of [−1, 1]. That is, the case where the value of $e_a$ is 1 indicates an intense state, and the case where the value of $e_a$ is −1 indicates a mild state.

In the conventional technology, only clear emotional states, such as happy, angry, sleepy, and bored, could be represented. However, when the emotional state representation scheme proposed by Russell is used, uncertain emotion corresponding to a middle level, rather than clear emotional states, may also be represented by emotional state coordinates ($e_p$, $e_a$) based on the two axes.

Meanwhile, as described above, the volume and speed of the robot nonverbal behavior may be determined based on the robot's emotional state, represented using the emotional state representation scheme proposed by Russell.

Here, the volume of the robot nonverbal behavior indicates how large the nonverbal behavior is made, and the speed thereof indicates how fast the movement of a hand or a body is made upon taking nonverbal behavior.

The volume $R_{volume}$ of the robot behavior may be determined using the following Equation (1) based on the emotional state value $e_p$ on the pleasant/unpleasant axis of the robot.

$$R_{volume}=1+c_1 \cdot e_p \tag{1}$$

In Equation (1), $c_1$ is a constant for determining the degree to which pleasantness or unpleasantness of the robot is to be reflected, and is set to a value falling within a range of (0, 1), which means that, as the value of the constant is larger, pleasantness or unpleasantness is reflected more.

That is, it means that, when the value of $R_{volume}$ is 1, the behavior generated by the neural network model for robot pose estimation is to be expressed without change, when the value of $R_{volume}$ is less than 1, an action smaller than the generated behavior is to be expressed, and when the value of $R_{volume}$ is greater than 1, an action greater than the generated behavior is to be expressed.

Also, the speed $R_{speed}$ of the robot behavior may be determined by the following Equation (2) based on the arousal (intensity or mildness) degree $e_a$.

$$R_{speed}=1+c_2 \cdot e_a \tag{2}$$

In Equation (2), $c_2$ is a constant for determining the degree to which intensity or mildness of the robot is to be reflected, and is set to a value falling within a range of (0, 1), which means that, as the value of the constant is larger, the intensity or mildness is reflected more.

That is, it means that, when the determined value of $R_{speed}$ is 1, the behavior generated by the neural network model for robot pose estimation is to be expressed without change, when the value of $R_{speed}$ is less than 1, an action slower than the generated behavior is to be expressed, and when the value of $R_{speed}$ is greater than 1, an action faster than the generated behavior is to be expressed.

Finally, a robot pose $p'_{next}$ in which the robot's emotion is reflected is determined by the following Equation (3):

$$p'_{next}=p_{curr}+R_{volume} \cdot R_{speed} \cdot (p_{next}-p_{curr}) \tag{3}$$

In Equation (3), $p_{next}$ denotes a robot pose generated by the neural network model for robot pose estimation, and $p_{curr}$ denotes the current pose of the robot.

Referring to FIG. 10, when (1) shows the current pose $p_{curr}$ and (3) shows the next pose $p_{next}$ generated by the neural network model for robot pose estimation, (2) and (4) show examples of the next robot pose in which the emotional state of the robot is reflected. (2) shows an example in which, when $R_{volume} \cdot R_{speed}<1$, an action smaller or slower than the original behavior is generated. In contrast, (4) shows an example in which, when $R_{volume} \cdot R_{speed}>1$, an action greater than or faster than the original behavior is generated. When the emotional state of the robot is neutral, and $R_{volume} \cdot R_{speed}=1$, the next robot pose generated by the neural network model for robot pose estimation is expressed without change.

Below, the operation of the final behavior decision unit 140 will be described in detail with reference to FIGS. 11 to 15.

Figure 11:
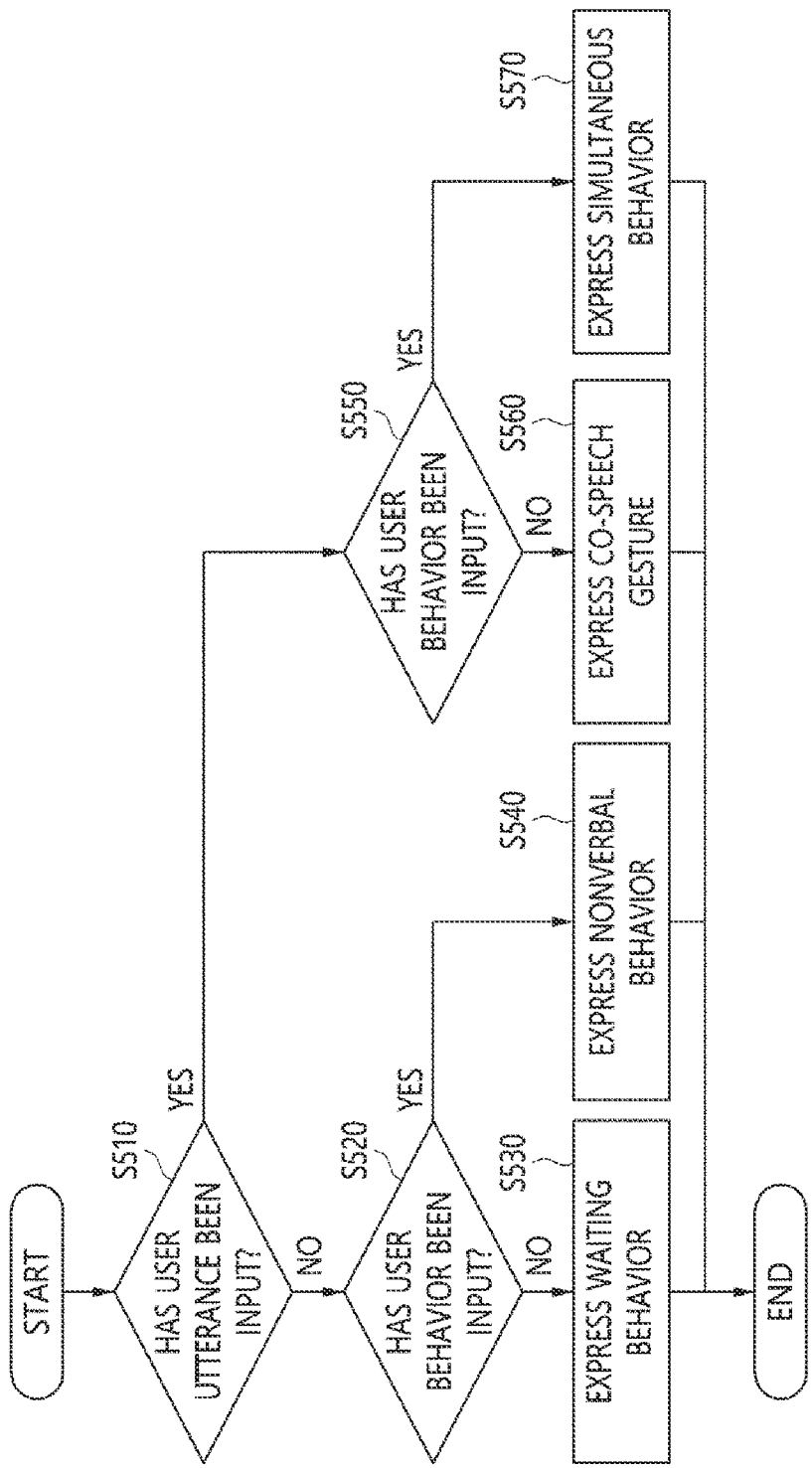
FIG. 11 is a flowchart illustrating a final behavior decision step in a waiting state of a robot according to an embodiment.

FIG. 11 is a flowchart illustrating a robot's final behavior decision step according to an embodiment.

Referring to FIG. 11, when the robot is in a waiting state, the final behavior decision unit 140 may decide on the final behavior based on the results of determining whether user utterance has been input and whether user behavior has been input.

If it is determined at steps S510 and S520 that neither user utterance nor user behavior have been input, the final behavior decision unit 140 remains in a waiting state at step S530.

If it is determined at steps S510 and S520 that user utterance has not been input and only user behavior has been input, the final behavior decision unit 140 expresses nonverbal behavior at step S540.

If it is determined at steps S510 and S550 that user utterance has been input and user behavior has not been input, the final behavior decision unit 140 expresses co-speech gesture at step S560.

If it is determined at steps S510 and S550 that both user utterance and user behavior have been input, the final behavior decision unit 140 simultaneously expresses co-speech gesture and nonverbal behavior at step S570.

By means of the above-described process, the robot may enter a waiting state, a co-speech gesture state, a nonverbal behavior state, or a simultaneous behavior state. In each state, the final behavior of the robot may again be decided on differently depending on the user input.

Figure 12:
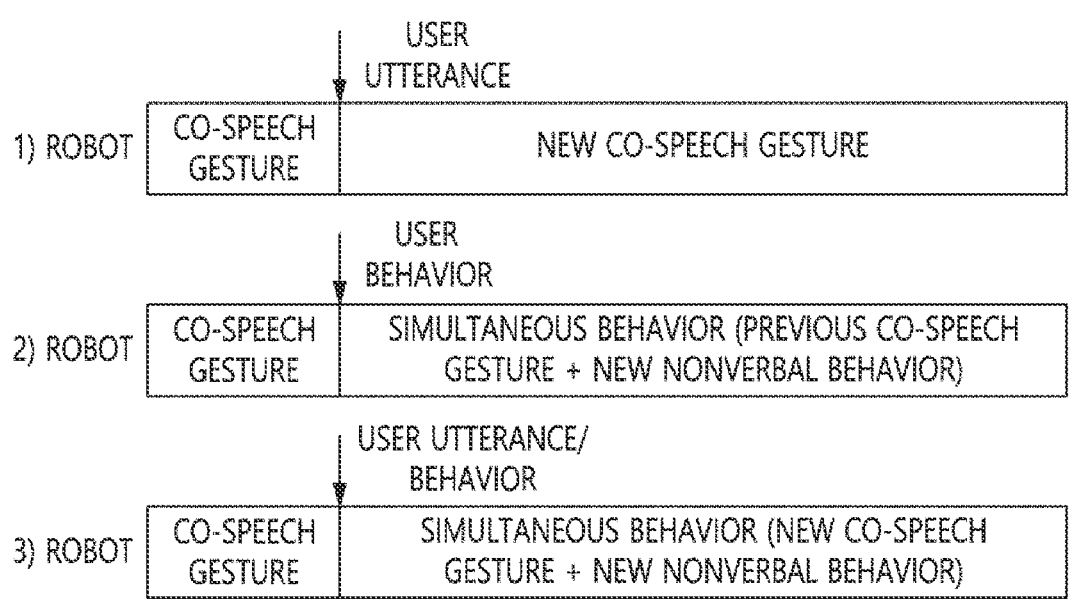
FIG. 12 is a diagram illustrating a final behavior decision scenario depending on user input in the co-speech gesture state of a robot according to an embodiment.

FIG. 12 is a diagram illustrating a final behavior decision scenario depending on user input in the co-speech gesture state of a robot according to an embodiment.

Referring to FIG. 12, when, in the co-speech gesture state of the robot, only user utterance is input as in the case of 1), the robot starts a new utterance, and thus co-speech gesture suitable for the new utterance content is generated without stopping the previous co-speech gesture.

When, in the co-speech gesture state of the robot, only user behavior is input, as in the case of 2), the final behavior decision unit 140 generates simultaneous behavior by combining new nonverbal behavior corresponding to the input user behavior with the previous co-speech gesture.

When, in the co-speech gesture state of the robot, user utterance and user behavior are simultaneously input, as in the case of 3), the final behavior decision unit 140 stops the previous co-speech gesture and generates simultaneous (concurrent) behavior by combining the newly generated co-speech gesture and nonverbal behavior with each other.

Figure 13:
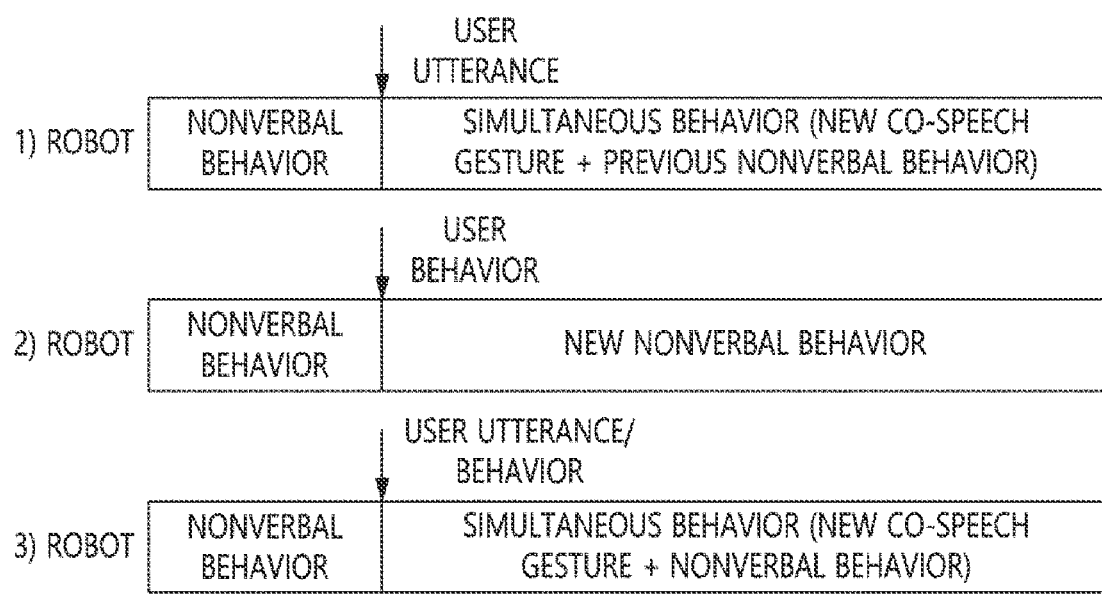
FIG. 13 is a diagram for explaining a final behavior decision scenario depending on user input in the nonverbal behavior state of a robot according to an embodiment.

FIG. 13 is a diagram for explaining a final behavior decision scenario depending on user input in the nonverbal behavior state of a robot according to an embodiment.

Referring to FIG. 13, when, in the nonverbal behavior state of the robot, only user utterance is input, as in the case of 1), the final behavior decision unit 140 generates simultaneous behavior by combining newly generated co-speech gesture with the previous nonverbal behavior.

When, in the nonverbal behavior state of the robot, only user behavior is input, as in the case of 2), the final behavior decision unit 140 generates new nonverbal behavior corresponding to the input user behavior.

When, in the nonverbal behavior state of the robot, user utterance and user behavior are simultaneously input, as in the case of 3), the final behavior decision unit 140 stops the previous nonverbal behavior, and generate simultaneous (concurrent) behavior by combining the newly generated co-speech gesture and nonverbal behavior with each other.

Finally, since the processing scheme that is performed when the robot expresses simultaneous behavior is identical to that in the nonverbal behavior state illustrated in FIG. 13, a detailed description thereof will be omitted.

Meanwhile, when the above-described scenarios are taken into consideration, the simultaneous behavior is generated in the following situation.

That is, simultaneous behavior may be expressed in the case where the utterance and behavior of the user are simultaneously input in a waiting state, the case where the utterance of user is input in a nonverbal behavior state, and the case where the behavior of the user is input in a co-speech gesture state.

In this case, when two different behaviors are combined with each other, if a middle action between the two behaviors is just generated, unnatural actions can be taken. For example, even if shaking hands and high-fiving are similar moving actions, when behavior is generated along a middle trajectory between shaking hands and high-fiving, such a behavior is considered to be neither handshake behavior nor high-five behavior.

In contrast, when one of the two behaviors is simply selected, there may occur a situation in which one of the utterance and the behavior of the user is ignored. Therefore, in an embodiment, a simultaneous behavior generation method of increasing naturalness while maximally responding to both the utterance and the behavior of the user is proposed.

Figure 14:
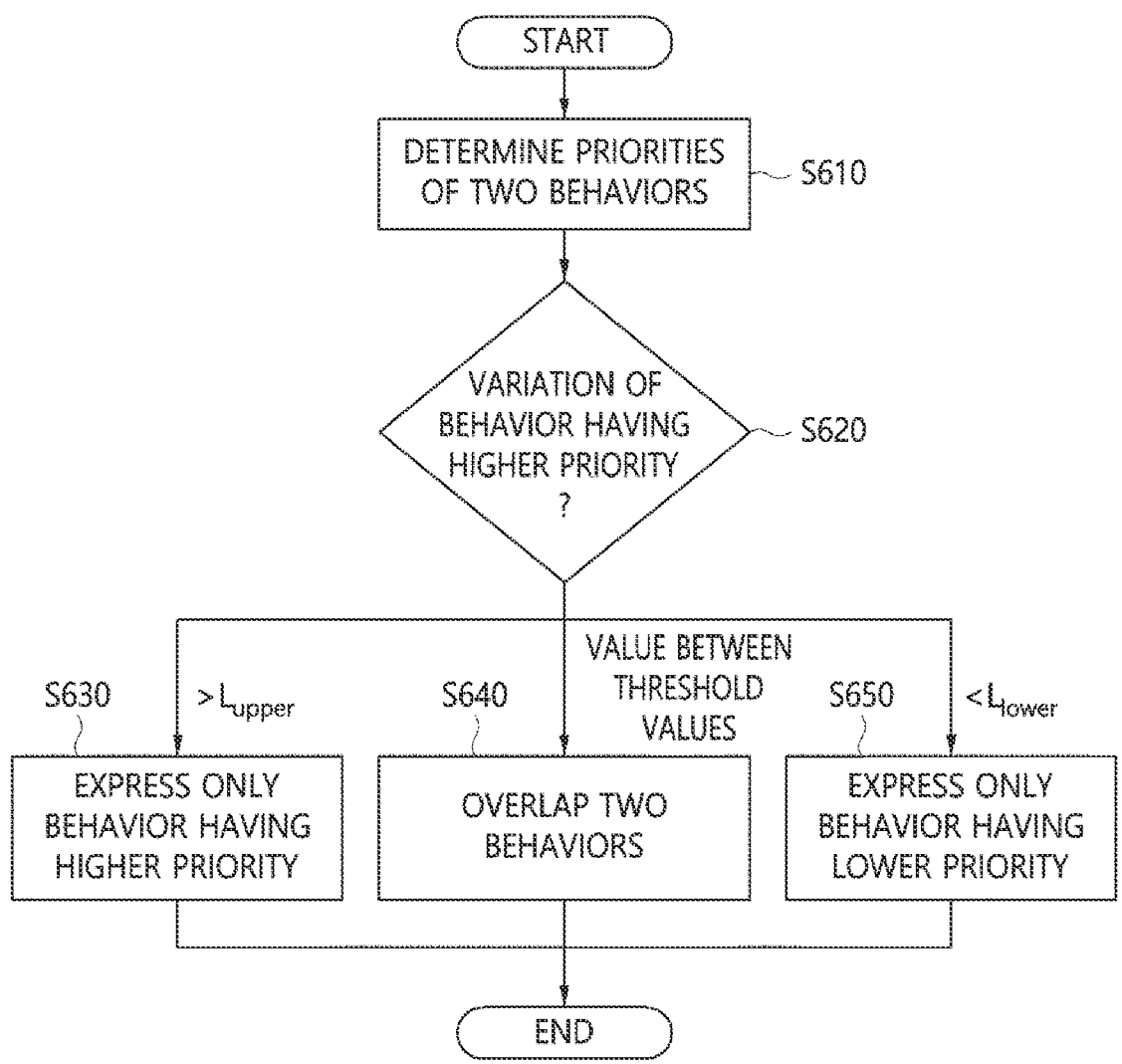
FIG. 14 is a flowchart illustrating a simultaneous behavior generation procedure according to an embodiment.
Figure 15:
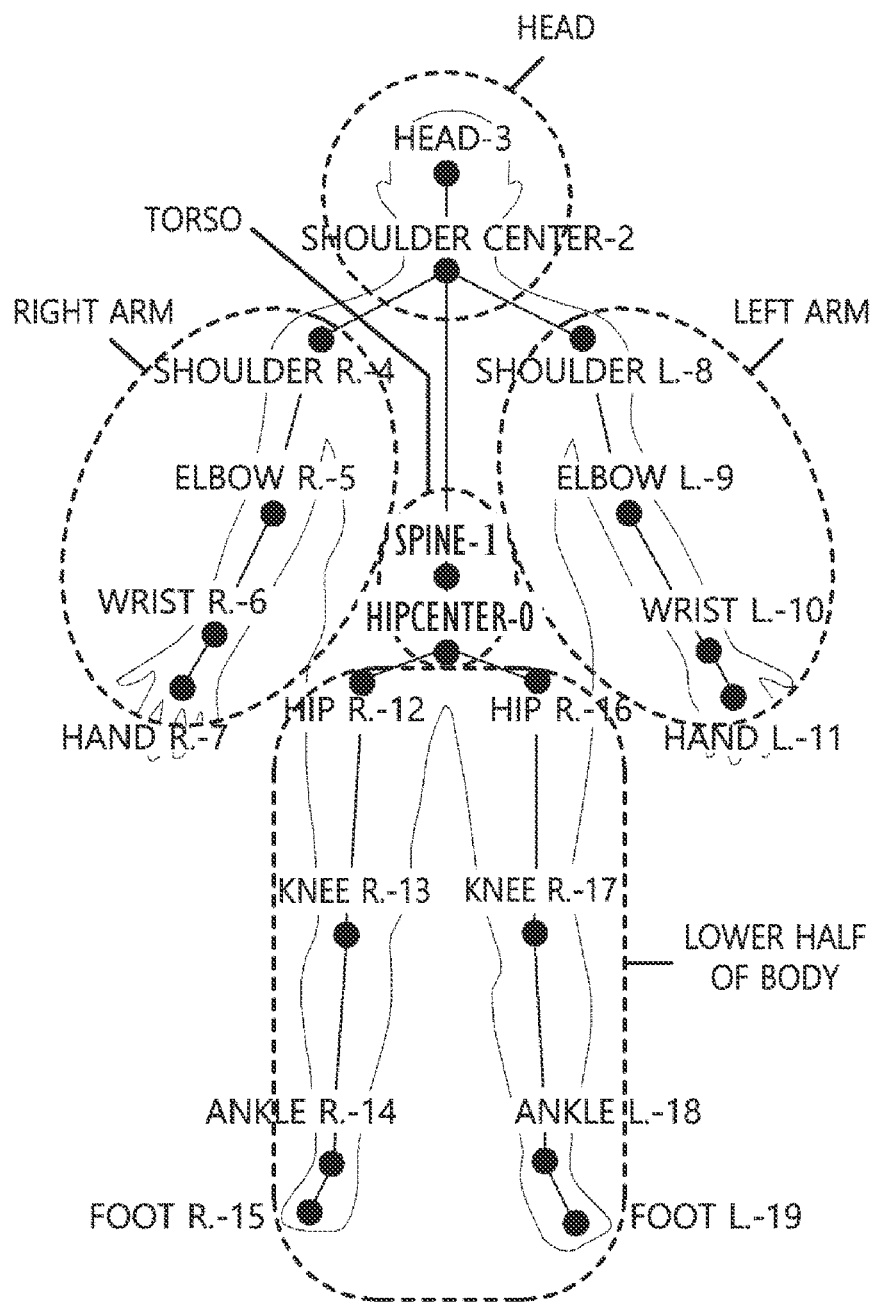
FIG. 15 is an exemplary diagram illustrating robot's joint categorization.

FIG. 14 is a flowchart illustrating a simultaneous behavior generation procedure according to an embodiment, and FIG. 15 is an exemplary diagram illustrating robot's joint categorization.

The final behavior decision unit 140 may determine which one of two behaviors is to be expressed in priority when two behaviors constituting simultaneous behavior collide with each other. This may be determined as follows depending on the features of the two behaviors.

Referring to FIG. 14, the final behavior decision unit 140 determines the priorities of the two behaviors at step S610.

For example, when new behavior is combined with previous behavior, as in the case of 2) in FIG. 12 or 1) in FIG. 13, the priority of the previous behavior may be set to a high value, and the priority of the new behavior may be set to a low value. That is, the reason for this is that, when behavior is continuously changed whenever new input is received, the behavior seems to be incoherent.

Further, when the utterance and behavior of the user are simultaneously input, as illustrated in FIG. 11, or when new co-speech gesture is combined with new nonverbal behavior, as in the situation illustrated in 3) of FIG. 12 or 3) of FIG. 13, the priority of the nonverbal behavior may be set to a high value, and the priority of the co-speech gesture may be set to a low value. The reason for this is that, even if the co-speech gesture is not expressed, the meaning of the utterance can be conveyed to some degree by means of the content of the utterance.

Thereafter, the final behavior decision unit 140 calculates the motional variation of behavior having a higher priority, and decides whether to overlap the two behaviors or to select one behavior based on the calculated motional variation at steps S620 to S650.

At this time, the motional variation of behavior may be calculated using the following Equation (4) as the sum of positional variations of all joints depending on the behavior.

$$(\text{motional variation}) = \sum_{all\ i} d(j_{i,curr},\ j_{i,next})$$

In Equation (4), $d(a,b)$ denotes the distance between point a and point b, and $j_{i,curr}$ and $j_{i,next}$ denote the current position and the next position of an i-th joint.

Depending on the value of the motional variation calculated using Equation (4), the scheme for combining the two behaviors may be determined as follows.

Referring to FIG. 14, when the variation of the behavior having a higher priority is greater than an upper threshold $L_{upper}$, the probability that the corresponding behavior is an important action is high, and thus the final behavior decision unit 140 expresses the corresponding behavior at step S630.

When the variation of the higher-priority behavior is less than the upper threshold $L_{upper}$ and is greater than the low threshold $L_{lower}$, the final behavior decision unit 140 overlaps the two behaviors with each other at step S640.

When the operational variation of the higher-priority behavior is less than the lower threshold value $L_{lower}$, the probability that the corresponding behavior will not be an important behavior is high, and thus the final behavior decision unit 140 ignores the corresponding behavior and selects and expresses lower-priority behavior at step S650.

At this time, $L_{upper}$, and $L_{lower}$, which are constant values, may be set differently by the user or a developer depending on the size of the robot or the environment in which the robot is driven, or may be determined through learning.

In this case, when two behaviors overlap each other, body categories respectively corresponding to the two behaviors are detected and motions by the detected body categories used to express the two behaviors are output. When at least one of the detected body categories corresponds to both of the two behaviors, at least one motion by the at least one of the detected body categories corresponds to a behavior having a higher priority.

Here, the body categories may include the head, torso, right arm, left arm, and lower half of the body, as illustrated in FIG. 15.

That is, overlapping of the two behaviors may be configured to find body joint categories chiefly used by higher-priority behavior, and to express lower-priority behavior using the remaining body joints. For example, when higher-priority behavior is a handshake action using a right hand, the body category chiefly used by this behavior is "right arm". At this time, when another behavior overlapping therewith is an action of pointing at a specific position with the left hand, the body joint categories that are chiefly used do not overlap each other, and thus the pointing action with the "left arm" is expressed while the handshake action with the "right arm" is expressed. Further, as another example, the body categories used by higher-priority behavior includes "torso" and "right arm", and the body categories used by lower-priority behavior includes "left arm" and "right arm". At this time, since the "torso" corresponds to the both of the two behaviors, a motion by the "torso" used to express the higher behavior is generated. Whereas, the "right arm" and "left arm" are used to express the higher-behavior and lower-behavior, respectively.

In contrast, when another behavior overlapping therewith is a high-live action made with the right hand, the chiefly used body joint categories are identically the "right arm", and thus only the handshake action, having higher priority, is expressed.

When body categories depending on behaviors are detected, they may be detected based on the positional variations of joints for respective body categories corresponding to each behavior.

That is, which of body categories is chiefly used may be determined based on whether the positional variation of each joint belonging to the corresponding category is greater than a predetermined threshold value. For example, in order to determine whether the corresponding behavior chiefly uses the right arm, the motional variation of the right arm can be calculated using the following Equation (5):

$$\text{(motional variation of right arm)} = \sum_{i \in A_{rightarm}} d(j_{i,curr}, j_{i,next}) \quad (5)$$

When this value is greater than a constant value of $T_{right\ arm}$, the right arm is determined to be the chiefly used body category. $T_{right\ arm}$ may be set differently by the user or developer depending on the size of the robot or a robot-driving environment, or may be determined through learning. $T_{right\ arm}$ is a set of joint numbers constituting the right arm.

Figure 16:
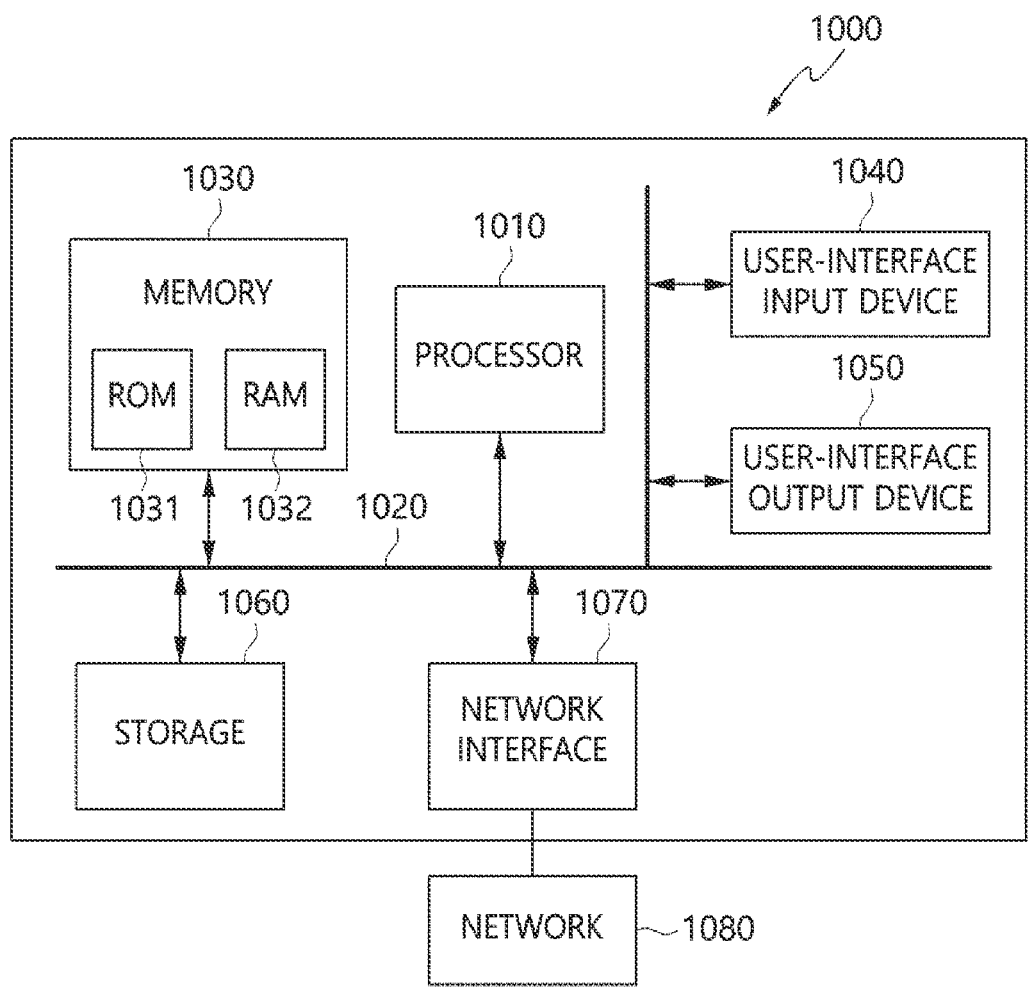
FIG. 16 is a diagram illustrating the configuration of a computer system according to an embodiment.

FIG. 16 is a diagram illustrating the configuration of a computer system according to an embodiment.

Each of an apparatus for generating robot interaction behavior and a neural-network-model learning apparatus for robot pose estimation according to embodiments may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium or an information delivery medium. For example, the memory 1030 may include Read-Only Memory (ROM) 1031 or Random Access Memory (RAM) 1032.

Meanwhile, a method for generating robot interaction behavior according to an embodiment may include at least one of the step of generating co-speech gesture of a robot corresponding to utterance input of a user and the step of generating nonverbal behavior of the robot corresponding to the behavior input of the user, and the step of deciding on at least one of co-speech gesture and nonverbal behavior as final behavior based on at least one of the utterance input and the behavior input of the user, and the current behavior of the robot.

Since the detailed operation of the method for generating robot interaction behavior according to the embodiment is identical to that of the apparatus for generating robot interaction behavior, which has been described above with reference to FIGS. 4 to 15, a detailed description thereof will be omitted.

In accordance with an embodiment, a robot living together with a person in space in which the person lives generates an interaction behavior corresponding to the person's behavior, thus forming the relationship between the person and the robot and enabling emotional communication therebetween.

In accordance with an embodiment, in a complex communicative context, which is not addressed by the conventional technology, that is, a context in which utterance (verbal or speech) communication and nonverbal (non-speech) communication are simultaneously performed, which nonverbal behavior is to be generated may be determined.

In accordance with an embodiment, a robot observes human-human nonverbal behaviors, autonomously learns the nonverbal behaviors, and automatically acquires communicative models, and thus there is an advantage in that, unlike the conventional technologies, a person does not need to personally define a nonverbal behavior pattern or to separately collect human-robot communicative patterns.

In accordance with an embodiment, there is an advantage in that a robot generates next joint positions at each step (each frame) and modifies the generated actions depending on the emotional state of the robot, rather than moving along a stored behavioral trajectory, and thus the generated actions (behaviors) are varied and the response speed is high.

Although the embodiments of the present invention have been disclosed, those skilled in the art will appreciate that the present invention can be implemented in other concrete forms, without departing from the technical spirit or essential features of the invention as disclosed in the accompanying claims. Therefore, it should be understood that the exemplary embodiment is only for illustrative purpose and does not limit the bounds of the present invention.

What is claimed is:

1. A method for generating robot interaction behavior, comprising:
    generating a co-speech gesture of a robot corresponding to an utterance input of a user;
    generating a nonverbal behavior of the robot, that is a sequence of next joint positions of the robot, which are estimated from joint positions of the user and current joint positions of the robot based on a pre-trained neural network model for robot pose estimation; and
    generating a final behavior using at least one of the co-speech gesture and the nonverbal behavior,
    wherein the pre-trained neural network model for robot pose estimation includes an encoder, which receives the position values of joints of the user for respective sequences, extracted from a first-person view image of the robot, and processes the position values of the joints; and a decoder, which receives the output values of the encoder and the current pose of the robot and outputs the next positions of the joints of the robot.

2. The method of claim 1, wherein generating the nonverbal behavior of the robot comprises:
    modifying the nonverbal behavior, generated based on the neural network model for robot pose estimation, depending on an emotional state of the robot.

3. The method of claim 2,
    wherein modifying the nonverbal behavior is configured to change the nonverbal behavior based on a volume of the nonverbal behavior, calculated depending on an emotional state value indicating a degree of pleasantness or unpleasantness, and a speed of the nonverbal behavior, calculated depending on an emotional state value indicating a degree of intensity or mildness.

4. The method of claim 1,
    wherein generating the final behavior is configured to:
    when the robot is in a waiting state,
    output only the co-speech gesture of the robot depending on the utterance input of the user,
    output only the nonverbal behavior of the robot depending on a behavior input of the user, and
    simultaneously output the co-speech gesture and the nonverbal behavior of the robot depending on the utterance input of the user and the behavior input of the user.

5. The method of claim 4,
    wherein generating the final behavior is configured to:
    when the robot is in the co-speech gesture state,
    output a new co-speech gesture of the robot depending on a new utterance input of the user,
    simultaneously output a previous co-speech gesture and a new nonverbal behavior of the robot depending on a new behavior input of the user, and
    simultaneously output a new co-speech gesture and a new nonverbal behavior of the robot depending on a new utterance input of the user and a new behavior input of the user.

6. The method of claim 5,
    wherein generating the final behavior is configured to:
    when the robot is in the nonverbal behavior state,
    simultaneously output a new co-speech gesture and a previous nonverbal behavior of the robot depending on a new utterance input of the user,
    output a new nonverbal behavior of the robot depending on a new behavior input of the user, and
    simultaneously output a new co-speech gesture and a new nonverbal behavior of the robot depending on new utterance input of the user and a new behavior input of the user.

7. The method of claim 1, wherein generating the final behavior comprises:
    when both of the co-speech gesture and the nonverbal behavior are generated,
    determining priorities of two behaviors including the co-speech gesture and the nonverbal behavior;
    calculating a motional variation of a behavior having a higher priority among the two behaviors; and
    outputting a new behavior based on the motional variation,
    wherein the new behavior is any one of the two behaviors or the two behaviors so as to overlap each other.

8. The method of claim 7,
    wherein determining the priorities is configured to determine the nonverbal behavior to have a priority higher than that of the co-speech gesture, or to determine the previous nonverbal behavior to have a priority higher than that of the new nonverbal behavior.

9. The method of claim 7,
    wherein calculating the motional variation is configured to calculate the motional variation as a sum of positional variations of all joints depending on each behavior.

10. The method of claim 7,
    wherein outputting the new behavior is configured to:
    when the motional variation is greater than an upper threshold value, output a behavior having a higher priority,
    when the motional variation is less than a lower threshold value, output a behavior having a lower priority, and
    when the motional variation is present between the upper threshold value and the lower threshold value, overlap the two behaviors with each other.

11. The method of claim 10,
    wherein outputting the new behavior is configured to:
    upon overlapping the two behaviors, detect body categories respectively corresponding to the two behaviors and output motions by the detected body categories used to express the two behaviors,
    when at least one of the detected body categories corresponds to both of the two behaviors, at least one motion by the at least one of the detected body categories corresponds to only a behavior having a higher priority.

12. The method of claim 11,
    wherein the body categories include a head, a torso, a right arm, a left arm, and a lower half of a body.

13. The method of claim 11,
    wherein outputting the new behavior is configured to, upon detecting body categories depending on behaviors, detect the body categories based on positional variations of joints for respective body categories corresponding to each behavior.

14. An apparatus for generating robot interaction behavior, comprising:
    a memory for storing at least one program; and
    a processor for executing the program,
    wherein the program performs:
    generating a co-speech gesture of a robot corresponding to an utterance input of a user;
    generating a nonverbal behavior of the robot, that is a sequence of next joint positions of the robot, which are estimated from joint positions of the user and current joint positions of the robot based on a pre-trained neural network model for robot pose estimation; and generating a final behavior using at least one of the co-speech gesture and the nonverbal behavior, wherein the pre-trained neural network model for robot pose estimation includes an encoder, which receives the position values of joints of the user for respective sequences, extracted from a first-person view image of the robot, and processes the position values of the joints; and a decoder, which receives the output values of the encoder and the current pose of the robot and outputs the next positions of the joints of the robot.

15. The apparatus of claim 14, wherein:

generating the nonverbal behavior of the robot comprises modifying the nonverbal behavior, generated based on the neural network model for robot pose estimation, depending on an emotional state of the robot, and modifying the nonverbal behavior is configured to change the nonverbal behavior based on a volume of the nonverbal behavior, calculated depending on an emotional state value indicating a degree of pleasantness or unpleasantness, and a speed of the nonverbal behavior, calculated depending on an emotional state value indicating a degree of intensity or mildness.

16. The apparatus of claim 14, wherein generating the final behavior comprises:

when both of the co-speech gesture and the nonverbal behavior are generated, determining priorities of two behaviors including the co-speech gesture and the nonverbal behavior;

calculating a motional variation of a behavior having a higher priority among the two behaviors; and outputting a new behavior based on the motional variation, wherein the new behavior is any one of the two behaviors or the two behaviors so as to overlap each other.

17. The apparatus of claim 16, wherein outputting the new behavior is configured to:

when the motional variation is greater than an upper threshold value, output a behavior having a higher priority, when the motional variation is less than a lower threshold value, output a behavior having a lower priority, and when the motional variation is present between the upper threshold value and the lower threshold value, overlap the two behaviors with each other.

18. The apparatus of claim 17, wherein outputting the new behavior is configured to:

upon outputting the two behaviors so as to overlap each other, detect body categories respectively corresponding to the two behaviors based on positional variations of joints for respective body categories corresponding to each behavior, and output motions by the detected body categories used to express the two behaviors, when at least one of the detected body categories corresponds to both of the two behaviors, at least one motion by the at least one of the detected body categories corresponds to only a behavior having a higher priority.

19. A method for generating robot interaction behavior, comprising:

generating a co-speech gesture of a robot corresponding to an utterance input of a user;

generating a nonverbal behavior of the robot corresponding to a behavior input of the user based on a neural network model for robot pose estimation; and generating a final behavior using at least one of the co-speech gesture and the nonverbal behavior, wherein the robot pose estimation neural network model includes an encoder, which receives the position values of joints of the user for respective sequences, extracted from a first-person view image of the robot, and processes the position values of the joints; and a decoder, which receives the output values of the encoder and the current pose of the robot and outputs the next positions of the joints of the robot, when both of the co-speech gesture and the nonverbal behavior are generated, determining priorities of two behaviors including the co-speech gesture and the nonverbal behavior;

calculating a motional variation of a behavior having a higher priority among the two behaviors; and outputting a new behavior based on the motional variation, wherein the new behavior is any one of the two behaviors or the two behaviors so as to overlap each other.

20. The method of claim 19, wherein outputting the new behavior is configured to:

upon outputting the two behaviors so as to overlap each other, detect body categories respectively corresponding to the two behaviors based on positional variations of joints for respective body categories corresponding to each behavior, and output motions by the detected body categories used to express the two behaviors, when at least one of the detected body categories corresponds to both of the two behaviors, at least one motion by the at least one of the detected body categories corresponds to only a behavior having a higher priority.

* * * * *